Nov. 25, 1930.  W. B. GRUETER  1,782,894

GANG EDGER

Filed June 14, 1926

INVENTOR.
William B. Grueter
BY
ATTORNEYS.

Patented Nov. 25, 1930

1,782,894

UNITED STATES PATENT OFFICE

WILLIAM B. GRUETER, OF MENOMINEE, MICHIGAN, ASSIGNOR TO THE PRESCOTT COMPANY, OF MENOMINEE, MICHIGAN, A CORPORATION OF MICHIGAN

GANG EDGER

Application filed June 14, 1926. Serial No. 115,761.

This invention relates to improvements in gang edgers, and more particularly to an improved construction of the supporting means for the arbor.

Gang edgers are used for trimming the edges of sawed lumber and comprise, in general, an arbor and suitable bearings supporting the ends thereof, circular saws splined on the arbor for rotation therewith and shifting movement axially thereof, and means for shifting the saws along the arbor to various desired positions with respect to each other. It is important in these machines that the bearings for the arbor support the latter for free rotary movement but hold the same against axial shifting with the saws upon adjustment of the latter to the desired positions. This requirement has given rise to a problem in edgers constructed heretofore due to the fact that in operation the saws heat up and by reason of their direct contact with the arbor cause heating up of the latter also and corresponding increase in the length thereof between the supporting members or bearings. It has been proposed to permit expansion and contraction of the arbor by using a single thrust bearing for properly positioning the arbor against axial shifting as a whole while the other bearing permits free axial movement. This construction has a disadvantage in that one of the bearings must be disassembled in removing the saws of the edger for sharpening, thus rendering it difficult and tedious to properly re-aline the bearings when the saws are replaced and the machinery assembled.

The present invention proposes to obviate this defect by an arrangement in which one bearing not only permits axial displacement, but also is so constructed that it may be removed and replaced as a unit without disturbing any of its component parts. One of the objects of the present invention, therefore, is to provide, in a gang edger, an improved construction of the bearing means for the arbor which will permit the required amount of expansion and contraction of the latter, will hold the same against axial shifting with the saws and yet will readily permit removal of the saws of the edger for sharpening.

Other objects and advantages will hereinafter appear.

For the purpose of illustrating the invention one embodiment thereof is shown in the drawings, in which.

Figure 1:
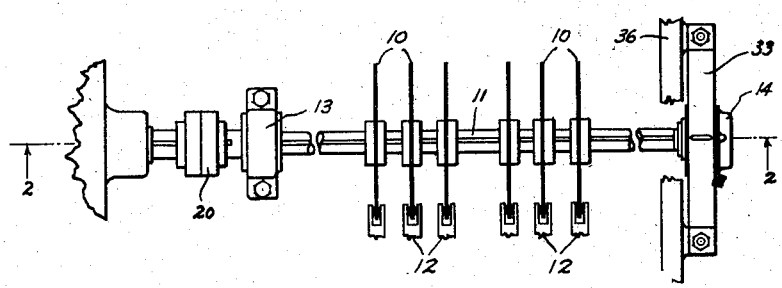
Figure 1 is a fragmentary plan view, partly broken away, of the arbor and the supporting bearings therefor.
Figure 2:
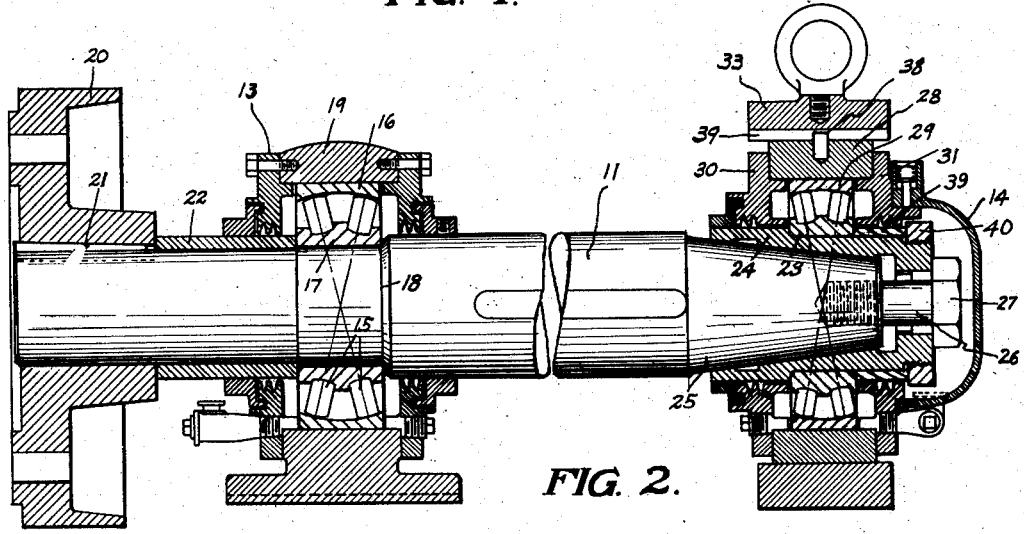
Fig. 2 is an enlarged sectional view, taken on the line 2—2 of Fig. 1.
Figure 3:
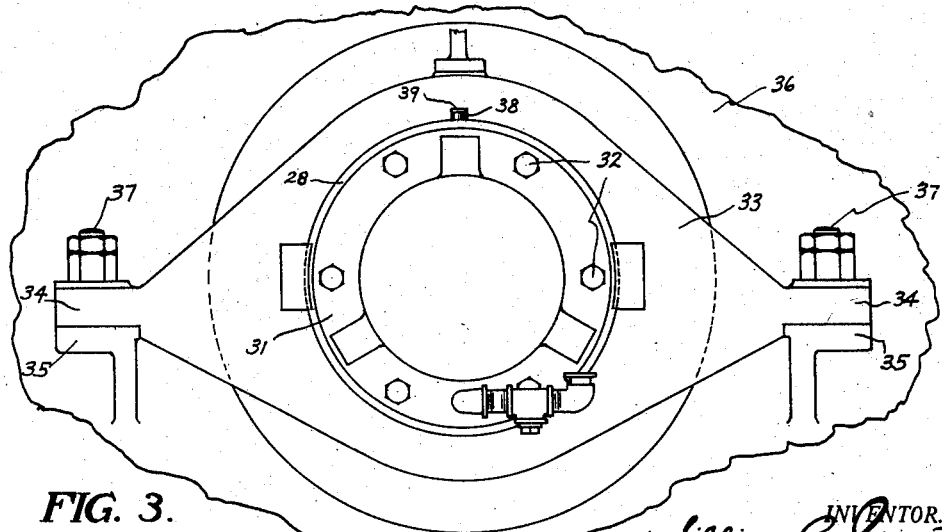
Fig. 3 is an elevational view, looking toward the left in Fig. 1.

The circular saws 10 are splined on the arbor 11 in the usual manner and are shifted axially along the latter by means of the usual shifting members 12, these members being adjusted by hand or by suitable power-operated means. The arbor is supported at its ends by means of the bearing assemblies designated generally by reference numerals 13 and 14.

The thrust bearing 13 may be of any suitable construction, the bearing shown in the drawings including rollers 15 interposed between an outer race 16 and an inner race 17 engaging a shoulder 18 with which this end of the arbor is provided. The outer race 16 is fixed in a suitable housing 19 fixed to the frame of the machine in any suitable manner. A suitable coupling member 20 is fixed on this end of the arbor by means of a key 21 and provides a connection with the driving motor (not shown). A bushing 22 is arranged on the arbor between the coupling member 20 and the inner bearing race 17, engagement of the ends of the inner race 17 with shoulder 18 and the adjacent end of bushing 22 holding this end of the arbor against axial movement with respect to its bearing 13, the latter being fixed, as explained above, to the frame of the machine.

The bearing assembly 14, consisting of the bearing proper and its mountings is so designed that it may be removed from the arbor to permit removal of the saws. For this purpose the inner race 23 of the bearing is not fitted directly upon the arbor 11, but is secured to a bushing 24 by a sleeve 39 and nut 40. The bushing 24 is provided with a longitudinally extending tapered bore receiving the tapered end 25 of the arbor. A bolt 26 is passed through the outer end of bushing 24 and is screwed tightly into the adjacent end of the arbor to bring the head 27 of the bolt into tight engagement with the adjacent end of bushing 24 whereby this end of the arbor is drawn tightly into and held in position in the bushing. An annular member 28 is fitted over the outer bearing race 29 and is arranged between the parts 30 and 31 comprising the bearing housing, member 28 acting to space these parts and being held in fixed assembled relation with respect thereto by means of bolts 32 extending through the member and the housing parts 30 and 31. A frame 33, or what is sometimes referred to as a bridge tree, is provided with a central opening into which member 28 loosely fits, the ends 34 of frame 33 resting on suitable lugs 35 cast integrally with the frame member 36 and secured thereto by means of bolts 37.

The entire bearing assembly 14, consisting of the bridge tree 33, annular member 28, the bearing races 23 and 29 and the bushing 24, may be removed as a unit by removing the bolt 27 on the end of the arbor and the bolts 37 which secure the bridge tree to the lugs 35 of the main frame. The assembly of the parts of the bearing itself, that is, the races 23 and 29 together with the rollers therebetween are not disturbed by such removal. After the bearing assembly 14 has been removed the saws may be readily removed.

From the foregoing it will be seen that the relatively fixed frame or bridge tree 33 supports bearing 14 for bodily movement in a direction axially of arbor 11 by reason of the sliding fit between member 28 and this frame and that this bearing can be quickly removed and replaced without disturbing its alinement with bearing 13.

For the purpose of holding member 28 and the bearing parts against rotation in frame 33 about the axis of rotation of the arbor, a pin 38 is fixed in the outer face of member 28 and extends slightly beyond the same and into a transverse groove 39 cut in the adjacent and inner face of frame 33, the extended end of pin 38 having a sliding fit in groove 39.

From the foregoing it will be seen that bearing 13 supports the left end of the arbor for free rotary movement while holding this end against axial movement, and that the relatively fixed frame or bridge tree 33 supporting bearing 14 for the right end of the arbor permits of free bodily movement of bearing 14 in a direction axially of the arbor, the bolt 27 holding bearing 14 securely in place on the right end of the arbor.

Upon expansion of the arbor due to heating up of saws 10 in operation of the machine, bearing 14 fixed to the right end of the arbor will shift axially a corresponding amount in the supporting frame or bridge tree 33, this action entirely compensating for expansion of the arbor and eliminating strain on the bearing parts which would otherwise occur to distort and possibly rupture the latter.

One embodiment of the invention has been shown and described, but of course various changes may be made such as in the size, shape and arrangement of the parts without departing from the spirit of the invention or the scope of the claims.

The invention claimed is:

1. In a gang edger having an arbor, saws splined thereon and a bridge tree adjacent one end of the arbor, a bearing slidably mounted in said bridge tree, said bearing including cooperable rotating and supporting parts, and means for detachably connecting said bearing to said arbor whereby the bearing may be removed as a unit to permit removal of the saws from said arbor.

2. In a gang edger having a frame, an arbor rotatably supported on the frame and saws splined on said arbor, a member detachably secured to one end of the arbor, a bearing mounted on said member, said bearing including cooperable rotating and supporting parts, and a bridge tree slidably supporting said bearing.

3. In a gang edger, the combination of a frame, an arbor, saws splined on the arbor, a thrust bearing for rotatably supporting the arbor and for preventing axial displacement thereof, a member detachably secured to the arbor, a second bearing mounted on said member, said second bearing including cooperable rotating and supporting parts, and a bridge tree slidably supporting said second bearing.

4. A gang edger comprising a supporting frame, an arbor, a plurality of saws splined on an intermediate portion of the arbor for independent shifting movement, a fixed bearing on one side of the saws for supporting the arbor for rotation and positively holding it against axial displacement, a bushing fitted on the arbor on the other side of the saws, means for detachably securing the bushing to the arbor, a second bearing mounted on said bushing and positively secured thereto, said second bearing including cooperable rotating and supporting parts, an annular member supporting said second bearing and slidably supported in the supporting frame and means for preventing rotation of said annular member with respect to said frame.

5. In a saw having a frame, an arbor rotatably supported on the frame and a saw on the arbor, a bearing detachably secured to the arbor, said bearing including cooperable rotating and supporting parts, a member fitted over the bearing for supporting the same and means for slidably supporting the member on the frame.

6. In a saw having a frame, an arbor rotatably supported on the frame and a saw on the arbor, a bearing detachably secured to the arbor, said bearing including cooperable rotating and supporting parts, a member fitted over the bearing for supporting the same and means for slidably supporting the member on the frame, said means being detachably secured to said frame.

In witness whereof I hereto affix my signature.

WILLIAM B. GRUETER.